(12) United States Patent
Andersson et al.

(10) Patent No.: US 6,692,199 B2
(45) Date of Patent: Feb. 17, 2004

(54) CUTTING INSERT FOR GROOVING AND PROFILING

(75) Inventors: Claes Andersson, Valbo (SE); Håkan Fransson, Gävle (SE)

(73) Assignee: Sandvik AB, Sandviken (SE)

(*) Notice: Subject to any disclaimer, the term of this patent is extended or adjusted under 35 U.S.C. 154(b) by 0 days.

(21) Appl. No.: 10/353,934

(22) Filed: Jan. 30, 2003

(65) Prior Publication Data

US 2003/0170081 A1 Sep. 11, 2003

(30) Foreign Application Priority Data

Jan. 31, 2002 (SE) .............................. 0200310

(51) Int. Cl.$^7$ .............................................. B23B 27/22
(52) U.S. Cl. ..................... 407/116; 407/115; 407/114
(58) Field of Search .......................... 407/113, 114, 407/115, 116, 117

(56) References Cited

U.S. PATENT DOCUMENTS

| | | | |
|---|---|---|---|
| 4,028,782 A | * | 6/1977 | Stansak ........................ 407/113 |
| 4,844,668 A | | 7/1989 | Pettersson |
| 4,969,779 A | * | 11/1990 | Barten ......................... 407/114 |
| 5,205,680 A | | 4/1993 | Lindstedt |
| 5,342,151 A | | 8/1994 | Friedmann |
| 5,511,911 A | * | 4/1996 | Katbi et al. .................. 407/114 |
| 5,827,017 A | | 10/1998 | Tägström et al. |
| 6,086,291 A | | 7/2000 | Hansson et al. |
| 6,200,072 B1 | | 3/2001 | Andersson |

FOREIGN PATENT DOCUMENTS

EP 1 129 795 9/2001

* cited by examiner

Primary Examiner—Willmon Fridie, Jr.
(74) Attorney, Agent, or Firm—Burns, Doane, Swecker & Mathis, LLP

(57) ABSTRACT

A cutting insert for grooving and parting as well as profiling and longitudinal turning of metallic work-pieces, includes a shaft part and at least one cutting head. There is a front end surface at the front end of the cutting insert, and a rear end surface at the rear end of the cutting insert. The shaft part includes a top side, a bottom side and side surfaces extending between the tope and bottom two sides. The cutting head carries a cutting edge defined by the intersection between a chip surface and a clearance surface. The cutting edge has a circular shape and has mainly a constant curvature between the ends thereof. The chip side of the cutting head is provided with a first chip-forming device placed immediately inside the cutting edge.

17 Claims, 7 Drawing Sheets

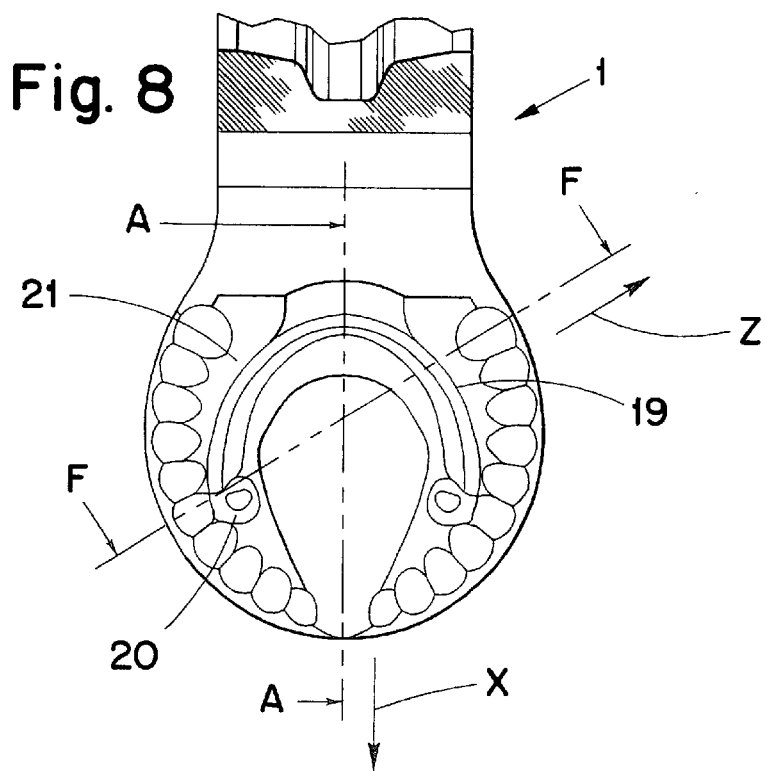
Fig. 8
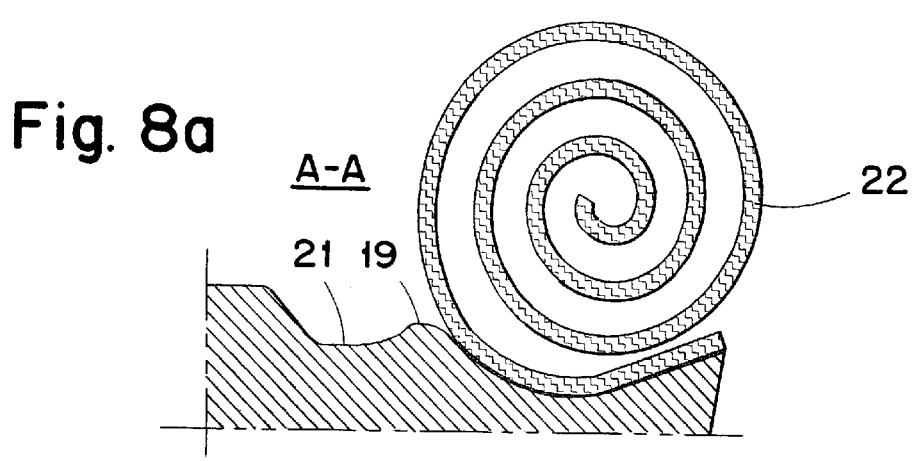
Fig. 8a    A-A
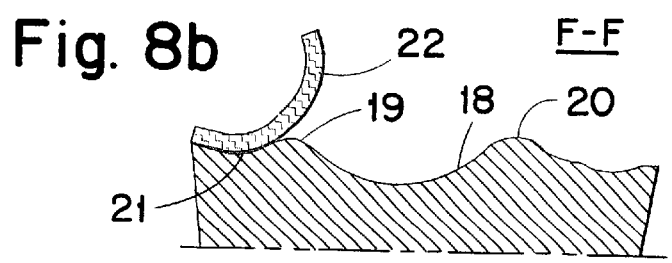
Fig. 8b    F-F

Fig. 11
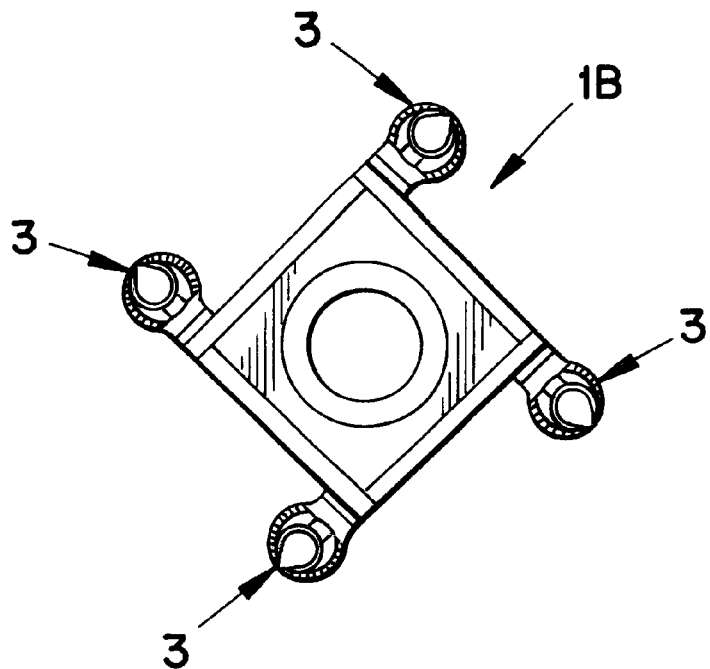
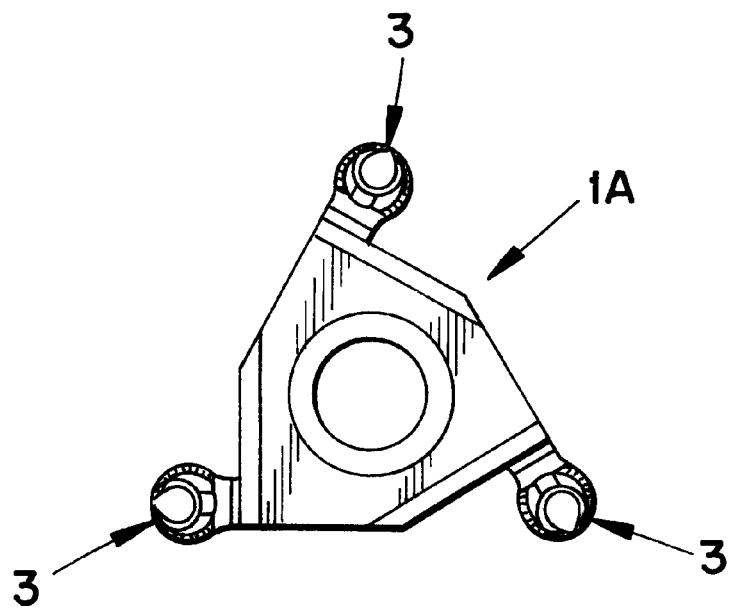
Fig. 10

CUTTING INSERT FOR GROOVING AND PROFILING

This application claims priority under 35 U.S.C. §119 to patent application Ser. No. 0200310-1 filed in Sweden on Jan. 31, 2002, the entire content of which is hereby incorporated by reference.

TECHNICAL FIELD OF THE INVENTION

The present invention relates to a cutting insert for grooving and parting work-pieces. The insert is of the type comprising a shaft part having at least one cutting head thereon. An end surface is disposed at the front end of the cutting insert, and a rear end surface is disposed at the rear end of the cutting insert. The shaft part comprises a top side, a bottom side as well as two sides side surfaces extending between the same. The cutting head carries a cutting edge which is defined by the intersection between a chip side and a clearance side. The cutting edge has a circular shape and has mainly the same (constant) curvature up to the ends thereof, the chip side of the cutting head is provided with a first chip-forming device placed immediately inwards from the cutting edge. Such a cutting insert is also suitable for profiling and longitudinal turning.

PRIOR ART

In such machining (i.e., grooving, parting, profiling and longitudinal turning), the chip breaking and the chip forming are frequently of crucial importance for undisturbed production. Modern, high-production machine tools make great demands on a good chip release. Long, uncontrollable chips may easily cause operational shutdowns and make it necessary to scrap components. Therefore, chip control has to be given close attention and it controls, to a large extent, the design of the cutting tools.

A requirement that affects the design of the cutting tool is the requirement for diversification. A tool that may handle a number of different operations or very varying cutting conditions may replace a number of "conventional" tools that are more limited. A tool having the initially mentioned properties is to a large economic advantage in the machining industry because of decreased time losses for tool exchanges and savings, which are the result of a smaller number of tools.

A cutting insert for grooving as well as the widening of grooves comprising a partly circular cutting edge and a chip side provided with a number of concave recesses which intersect each other and placed immediately inwards from the cutting edge is, for instance, known from Swedish Patent 454248 (corresponding to U.S. Pat. No. 4,844,668). In practice, it has turned out that the ability of said cutting insert to give good chip control in a large a number of turning operations irrespective of feeding direction and over a large span of different cutting depths is very limited. This limitation is particularly large in connection with a plunging operation, which frequently starts the operations that are concerned.

An additional cutting insert for grooving as well as the widening of grooves, which comprises two ridges and bumps, is for instance known from EP 0 775 544 (corresponding to U.S. Pat. No. 5,827,017). The rectangular shape of the cutting head makes it suitable for plunging and grooving but not for profiling.

An object of the present invention is to form a cutting insert in such a way that it may carry out a large a number of turning operations irrespective of whether the cutting insert is mounted axially or radially in relation to the workpiece.

Another object is to adapt the cutting insert for good chip control irrespective of feeding direction, cutting depth, cutting speed or the material of the workpiece.

An additional object of the invention is to form a cutting insert, which cuts easily particularly during the plunging step of an overall cutting operation.

SUMMARY OF THE INVENTION

These and other objectives have been attained by a cutting insert for grooving and profiling which comprises a shaft part and at least one cutting head. There is a front end surface at a front end of the cutting insert, and a rear end surface at a rear end of the cutting insert. The shaft part comprises a top side, a bottom side, and side surfaces extending between the top and bottom sides. The cutting head carries a cutting edge defined by an intersection between a chip side and a clearance side of the cutting head. The cutting edge has a circular shape and a substantially constant curvature between the opposite ends thereof. The chip side of the cutting head is provided with a first chip-forming device placed immediately inside the cutting edge. The chip side of the cutting head further has a second chip-forming device located symmetrically around a center line of the cutting insert. The second chip-forming device comprises a chip-breaking depression, and a ridge. The depression is disposed inside of the first chip-forming device, except for a tip portion of the depression which extends along the center line up to the cutting edge. The ridge borders a rear part of the chip-breaking depression.

BRIEF DESCRIPTION OF THE DRAWINGS

For illustrative but not limiting purposes, a preferred embodiment of the invention will now be described.

FIG. 8 shows a detailed enlargement of the chip surface of the cutting insert straight from above with two different, additional cross-sections marked.

FIG. 8a shows cross-sections of the cutting insert according to the line A—A in FIG. 8 and a typical chip produced during a plunging operation.

FIG. 8b shows cross-sections of the cutting insert according to the line F—F in FIG. 8 and a typical chip produced during a profiling operation.

FIG. 10 is a top plan view of a first alternative embodiment of the invention having three cutting heads.

FIG. 11 is a top plan view of a second alternative embodiment of the invention having four cutting heads.

DESCRIPTION OF PREFERRED EMBODIMENTS OF THE INVENTION

Figure 1A:
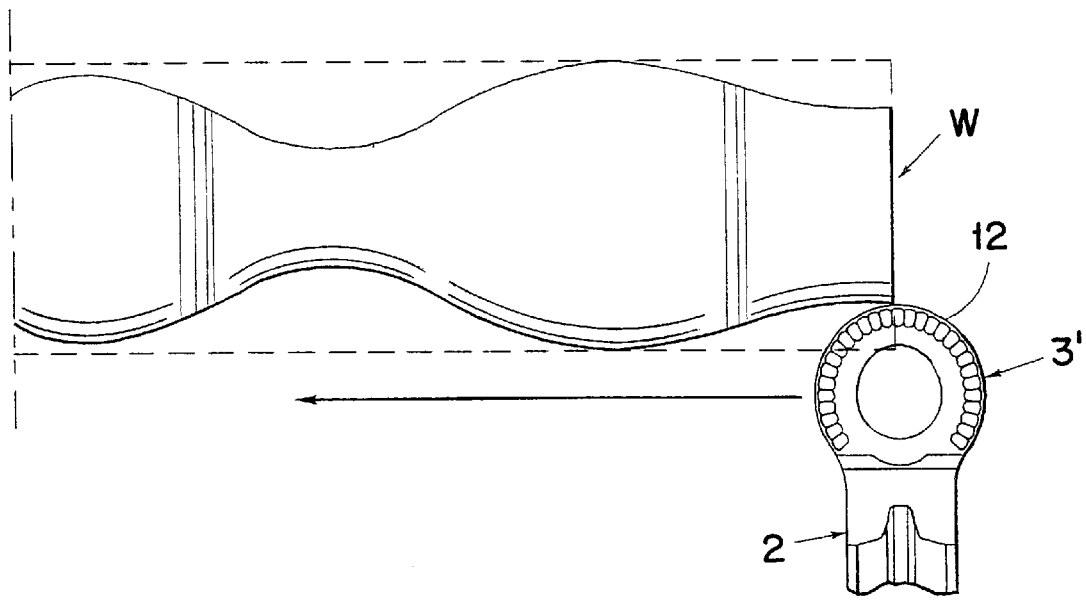
FIG. 1a shows a cutting insert and workpiece according to prior art.

FIG. 1a shows a workpiece (W) and a cutting insert (2, 3') according to prior art. The cutting insert is most suited for profiling operations wherein the cutting insert moves essentially parallel to the center line of the workpiece. This cutting insert is most suited to commence at the outer end of the workpiece and for machining with low cutting data.

Figure 1B:
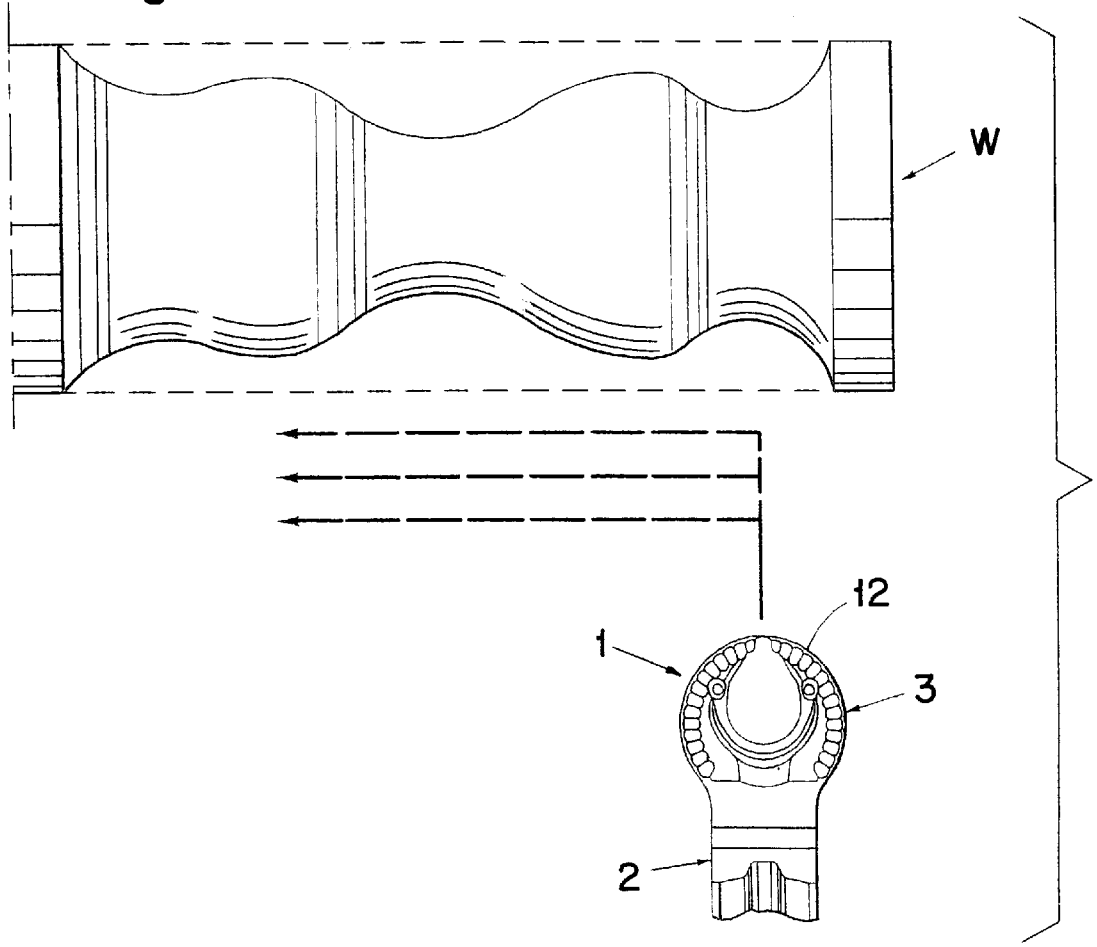
FIG. 1b shows a cutting insert and workpiece according to the invention.
Figure 2:
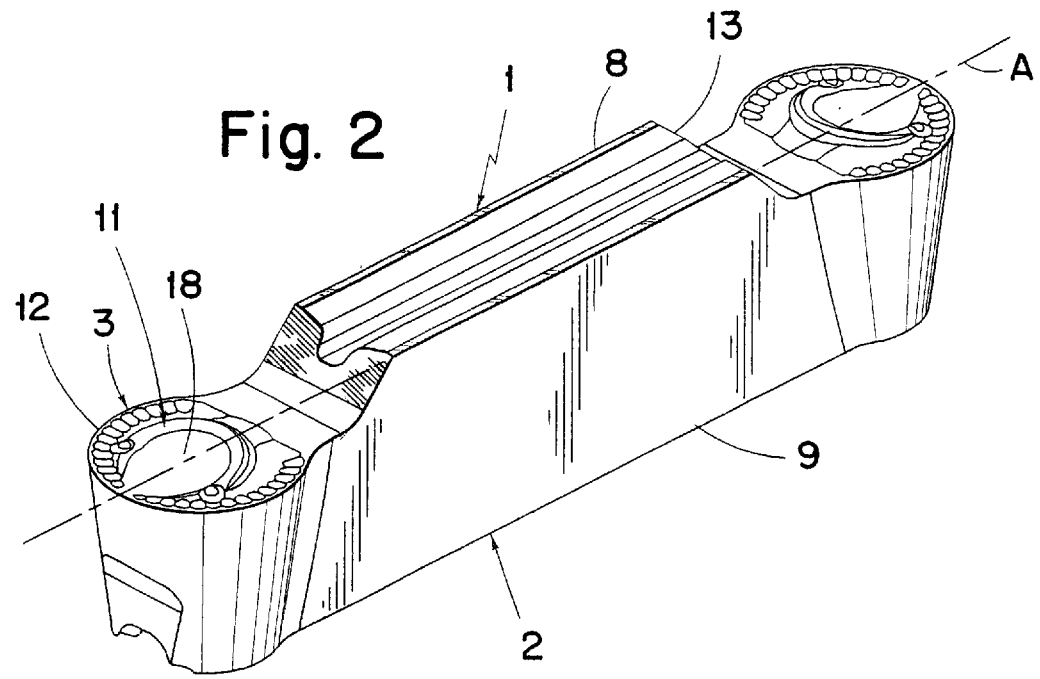
FIG. 2 shows a cutting insert according to the invention in perspective obliquely from above.
Figure 3:
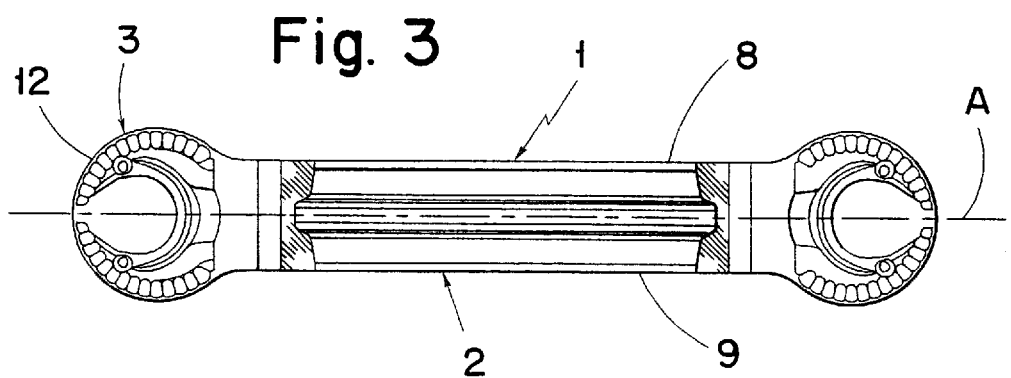
FIG. 3 shows the same cutting insert as FIG. 2 straight from above.
Figure 4:
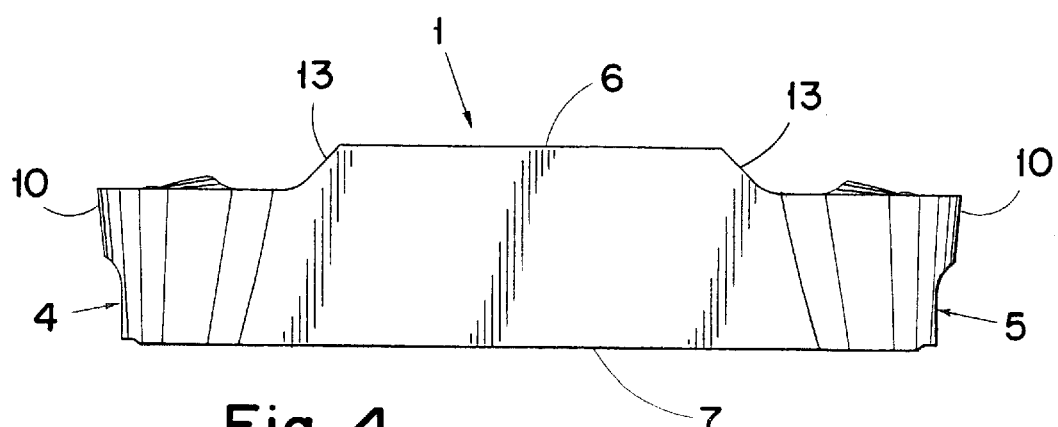
FIG. 4 shows a side view of the cutting insert.
Figure 5:
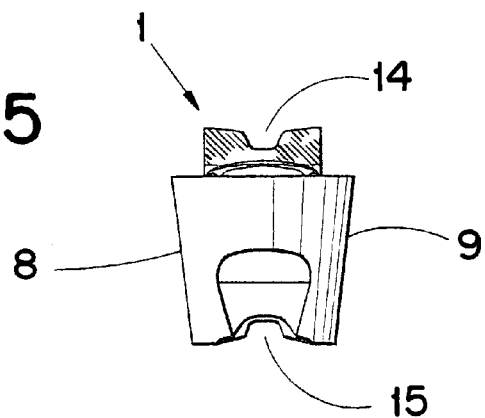
FIG. 5 shows an end view of the cutting insert.

FIG. 1b shows a work-piece (W) and a cutting insert (2, 3) according to the invention. The cutting insert is suited for all profiling and longitudinal turning operations, and also those that involve a heavy plunging operation.

FIGS. 2–5 show a cutting insert (1) for grooving and profiling operations according to the invention comprising a body having a shaft part (2) for clamping in a suitable tool holder. The cutting insert is produced of a suitable hard material, such as cemented carbide, ceramics or the like which furthermore may be coated. The body comprises two cutting heads (3), two end surfaces (4, 5), two side surfaces (8, 9), a shaft top side (6) and a shaft bottom side (7), as well as two shoulders (13). The cutting insert (1) should be fastened in a holder body provided with an integrated clamping arm whereby the cutting insert is clamped in a working position by the force that the arm exerts on the cutting insert.

Each of the top (6) and bottom sides (7) of the shaft is formed with a wedge groove (14 and 15) extended in the longitudinal direction having a concave contour in cross-section. Said concave groove along the middle of the topside of the shaft connects to inclined surfaces on both sides. Both sides of the central concave groove along the middle of the bottom side of the shaft, have corresponding crooked, sloping surfaces which are intended to support against corresponding crooked support surfaces in a blade holder in the way which is described in Swedish Patent 511934 (corresponding to U.S. Pat. No. 6,086,291.

The cutting head comprises a chip side (11). The intersection of the chip side with a front clearance side (10) forms a cutting edge (12). The cutting edge (12) has a circular shape and has, in the main, a constant curvature between the ends thereof, i.e. the transition to the shaft part. Behind each chip side, there is a shoulder (13), which constitutes a transition to the topside (6) of the shaft.

Figure 6:
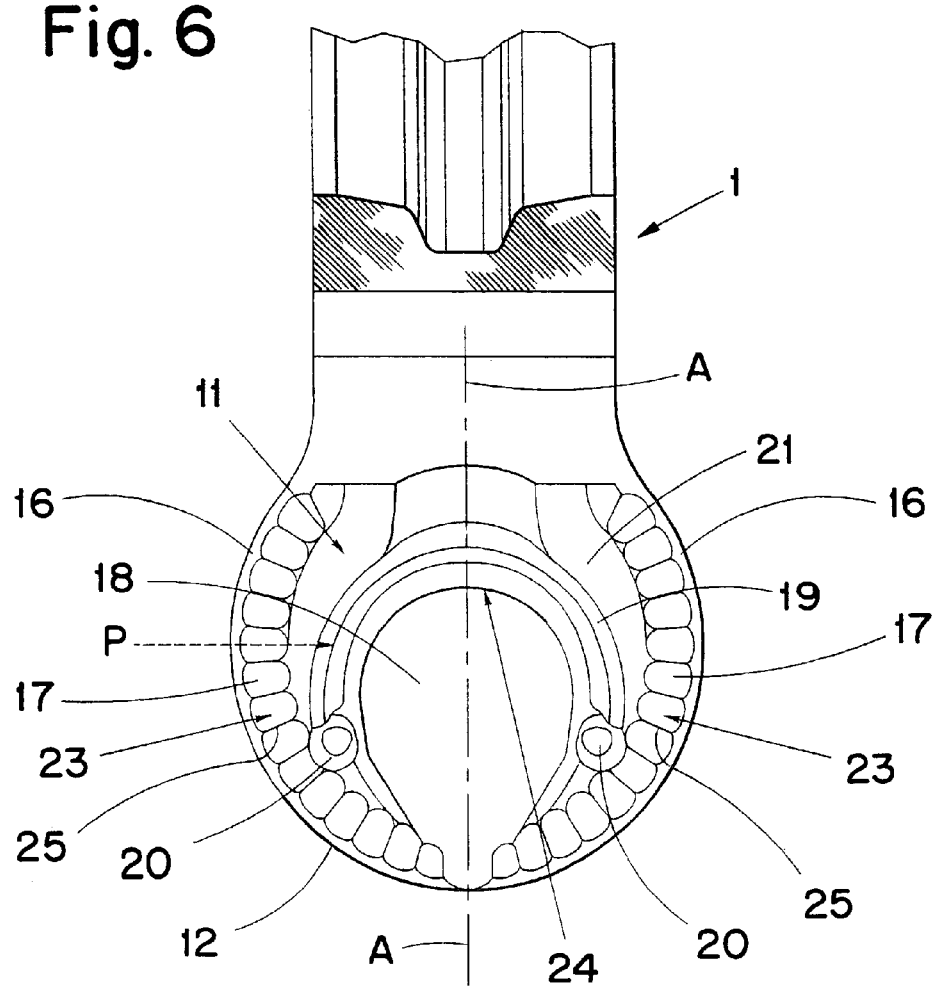
FIG. 6 shows the chip surface of the cutting insert straight from above.

FIG. 6 shows the chip surface of the cutting head in detail. The chip surface and the included elevations and depressions, which together constitute an enhanced chip breaking pattern, are placed symmetrically on each side of the center line (A) of the cutting insert. Said geometry consists of the following components described step by step from the cutting edge generally radially inwards along line (P). A mainly planar border (16) is located inside the cutting edge (12). The border is limited radially inwards by a first chip-forming device that in the preferred embodiment comprises a row of recesses (17) which intersect one another along mini-ridges (25) that have extensions perpendicular to a tangent to the cutting edge (12). Each recess (17) is shaped toroidly, alternatively spheroidly, ellipsoidly or paraboloidly concave. The recesses, that are approximately 28 in number, aim to give the cutting insert a positive chip angle of approx. 5 to 30° as well as to plastically deform a chip so it becomes easier to break. The mini-ridges (25) support the border (16).

Inwards from the above-mentioned recesses (17), the chip side (11) of the cutting head has a second device for chip breaking (24), see FIG. 6. That device is disposed symmetrically around the center line A of the cutting insert and comprises a drop-shaped chip-breaking depression (18), as well as a horseshoe-shaped ridge (19) which surrounds a rear part of the chip-breaking depression and as well as two bumps (20) at the ends of the ridge. The ridge (19) forms an arch, the radius of curvature of which is smaller than the radius of the edge (12) and which extends from one of its ends to the other along an angle of 140–190°, preferably 160–180°. The tip of the chip-breaking depression is placed exactly inside of, or at the point of intersection of, the cutting edge (12) and the center line (A) of the cutting insert. The other chip surface comprises a planar surface (21) placed between the radially innermost limiting line of the recesses (17) and the ridge (19) as well as the shoulder (13).

The first device (23) for chip breaking, which is described above, comprises two identical but symmetrically mirror-inverted geometries placed on each side of the center line (A) of the cutting insert. Important for the invention is that said two geometries do not meet at the front tip of the cutting insert, i.e. the point of intersection for the cutting edge and center line (A). On the contrary, they are terminated a certain distance from respective sides of such point of intersection in order to enable the above-mentioned tip of the chip-breaking depression (18), which is a part of the second device for the chip breaker (24), to reach as far as the cutting edge.

Figure 7:
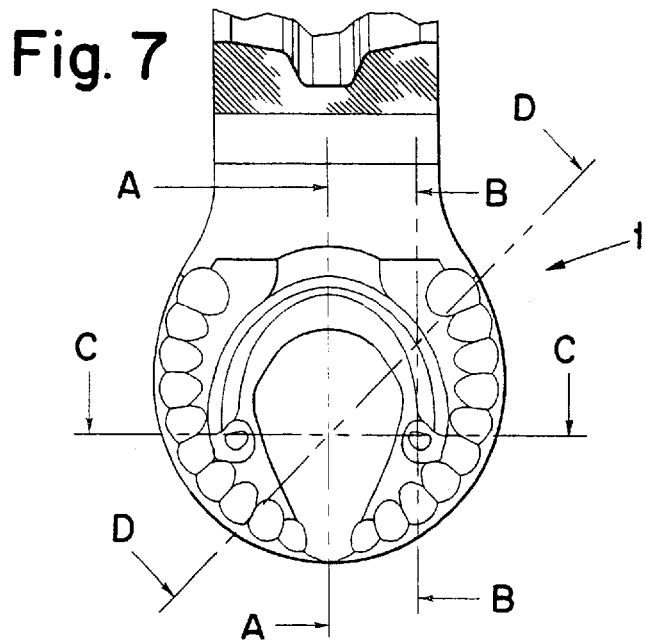
FIG. 7 shows a detailed enlargement of the chip surface of the cutting insert straight from above with different cross-sections marked.

In FIGS. 7 and 8 a number of cross-sections on a cutting insert are shown according to FIGS. 2–6 in order to make it easier to understand the geometry of the chip surface.

Figure 7A:
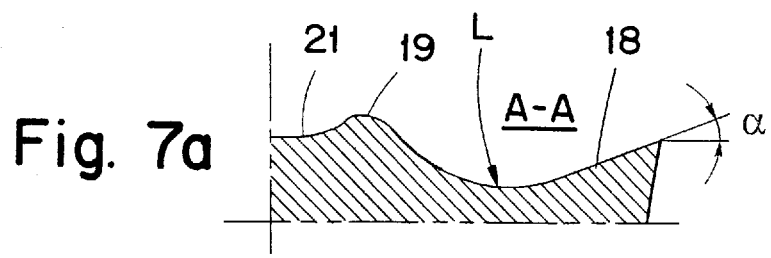
FIG. 7a shows cross-section of the cutting insert according to the line A—A in FIG. 7.

In FIG. 7a, a cross-section (A—A) along center line (A) is shown. The bottom surface of the depression (18) slopes downwards from the cutting edge (12) to a point (L) corresponding approximately to an imaginary line extending between the two bumps (20) and then it slopes upwards until it reaches the ridge (19). At the maximal height thereof, the top of the ridge is higher than the cutting edge but lower than the topside (6) of the shaft. Behind the ridge, the cross-section transforms into the plane surface (21) until it terminates at the shoulder (13). The surface defining the drop-shaped chip-breaking depression (18) forms, along the center line A of the cutting insert, an acute angle $\alpha$ with a line parallel to the bottom side (7) of the cutting insert, said angle being 5–30°, preferably 10–20°.

Figure 7B:
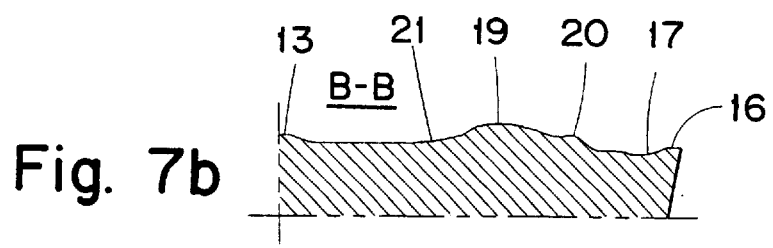
FIG. 7b shows a Cross-section of the cutting insert according to the line B—B in FIG. 7.

In FIG. 7b, a cross-section (B—B) is shown along a line parallel to center line (A) and through one of the bumps (20). From the cutting edge rearwards, we sequentially see the border (16), one of the recesses (17), the bump (20), the ridge (19), the plane surface (21) and finally the shoulder (13).

Figure 7C:
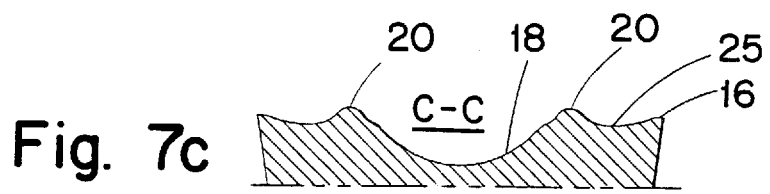
FIG. 7c shows a cross-section of the cutting insert according to the line C—C in FIG. 7.

In FIG. 7c, a cross-section (C—C) is shown along a line perpendicularly to the center line (A) and through the two bumps (20). From cutting edge to the center line (A), the cross-section comprises the border (16), the mini-ridge (25) between two recesses (17), the bump (20) and finally the chip-breaking depression (18).

Figure 7D:
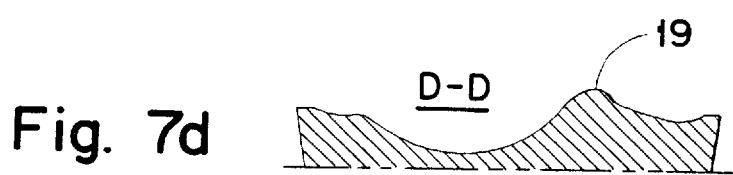
FIG. 7d shows a cross-section of the cutting insert according to the line D—D in FIG. 7.

In FIG. 7d, a cross-section (D—D) is shown along a line angled 45° to the center line (A).

In FIG. 8a, a cross-section (A—A) is shown along the center line (A) and how a typical chip (22) is formed when the cutting insert is used in a plunging operation, i.e. the cutting insert is moved forward in a direction (X), parallel to or somewhat angled from the center line (A) of the cutting insert. The acute angle of the cutting edge makes it easier to cut the material. The chips follow the bottom surface of the chip-breaking depression (18) and then they are broken or forced into a spiral by the rear surface of the chip-breaking depression and the ridge (19).

In FIG. 8*b*, a cross-section (F—F) is shown along the center line and how a typical chip (22) is formed when the cutting insert is moved in the direction (Z). If the cutting depth is shallow, the chips may be broken against the first device for chip breaking (23) but when the cutting depth is deeper, as in this case, the chips flow over the first device for chip breaking (23) and are broken or formed by the ridge (19).

Figure 9:
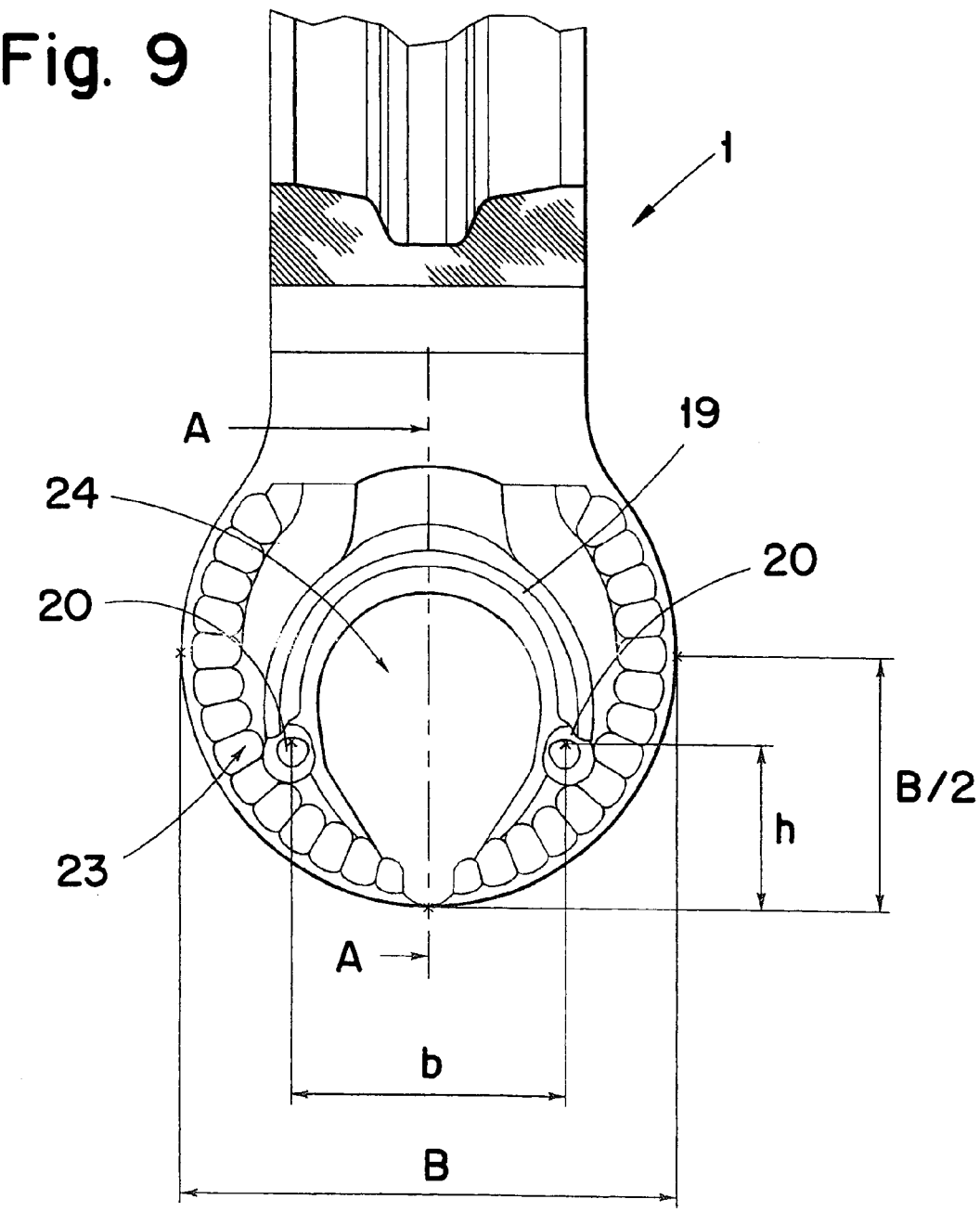
FIG. 9 shows a detailed enlargement of the chip surface of the cutting insert straight from above with a plurality of parameters given.

In FIG. 9, a number of parameters are shown on the cutting head such as the diameter (B) of the cutting head, the distance between the ends (b) of the ridge (19), and the distance (h) between a line perpendicular to center line (A) of the cutting insert, which passes through the front ridge ends (19) or bumps (20) and a parallel line which passes through or is at a tangent to the point where the cutting edge and center line (A) of the cutting insert meet. The distance (b) is 0.4–0.7 times, preferably 0.45–0.6 times, the diameter (B) of the cutting head (3). The distance (h) is 0.20–0.45 times the diameter (B) of the cutting head (3).

FEASIBLE MODIFICATIONS OF THE INVENTION

In the above-described embodiment, the ridges (19) are terminated at the bumps (20). However, it is also feasible within the scope of the present invention that the ridges terminate abruptly without the bumps, i.e. with steeply sloping surfaces.

In connection with the description of the embodiment above, it is mentioned that the first device for chip breaking (23) comprises a number of recesses (17) with intermediate mini-ridges (25) and that the device is divided into two groups on each side of the center line (A) of the cutting insert. It is also feasible that said device instead is built up of two ditches which replace the chain of recesses (17) and that said ditches have a steep rear wall (furthest away from the cutting edge) which controls and/or breaks the chips. The chip breaker may also comprise one only positive or neutrally sloping surface up to the ridge (19) or the depression (18).

As other possible embodiments, a cutting insert having one cutting head and one shaft (not shown), a cutting insert (1A) having three cutting heads 3 (FIG. 10), or a cutting insert (1B) having four cutting heads (3) (FIG. 11), may be feasible.

As other embodiments, a cutting insert having a so-called broken cutting edge in the front in an elliptic cutting head is also feasible. The elliptical shape for the cutting edge being perceived from above, and being possible to be used as a cutting insert having one and the same curvature. As seen from the front, the cutting edge become is depressed in the front compared with the rest of the cutting edge.

What is claimed is:

1. A cutting insert for grooving and parting as well as profiling and longitudinal turning of metallic workpieces, comprising a shaft part and at least one cutting head, a front end surface at a front end of the cutting insert, and a rear end surface at a rear end of the cutting insert, wherein the shaft part comprises a top side, a bottom side, and side surfaces extending between said top and bottom sides, said cutting head carrying a cutting edge defined by an intersection between a chip side and a clearance side of the cutting head, the cutting edge having a circular shape and a substantially constant curvature between opposite ends thereof, the chip side of the cutting head provided with a first chip-forming device placed immediately inside the cutting edge, the chip side of the cutting head further having a second chip-forming device located symmetrically around a center line of the cutting insert and comprising:

a chip-breaking depression disposed inside of the first chip-forming device except for a tip portion of the depression which extends along the center line up to the cutting edge, and a ridge bordering a rear part of the chip-breaking depression.

2. Cutting insert according to claim 1, wherein the chip-breaking depression of the second chip-forming device is drop-shaped when the chip surface is seen in top plan view.

3. Cutting insert according to claim 2, wherein the ridge forms an arch which from one end thereof to the other covers an angle of 140–190°.

4. The cutting insert according to claim 3, wherein the arch covers an angle of 160–180°.

5. Cutting insert according to claim 3, wherein the first chip-forming device comprises two identical, mirror-inverted devices on each side of the center line A, each of the identical devices terminating a distance from a point of intersection of the center line with the cutting edge to make room for the said tip portion of the chip-breaking depression.

6. Cutting insert according to claim 5, wherein a maximum height of the top of the ridge is higher than the cutting edge but lower than the topside of the shaft.

7. Cutting insert according to claim 6, wherein there are two bumps at the front ends of the ridge.

8. Cutting insert according to claim 7, wherein a surface defining the drop-shaped chip-breaking depression forms, along the center line, an acute angle to a line parallel to the bottom side of the cutting insert, said acute angle being 5–30°.

9. Cutting insert according to claim 8, wherein said acute angle is 10–20°.

10. Cutting insert according to claim 8, wherein a distance between the front ends of the ridge or the bumps is 0.4–0.7 times a diameter of the cutting head.

11. Cutting insert according to claim 10, wherein the distance is 0.45–0.6 times the diameter of the cutting head.

12. Cutting insert according to claim 10, wherein a distance between a first line extending perpendicular to the center line and passing through the front ridge ends or bumps and a second line parallel to the front line and passing through a point where the cutting edge and the center line meet is 0.20–0.45 times the diameter of the cutting head.

13. Cutting insert according to claim 12, wherein the cutting insert has three shafts and three cutting heads.

14. Cutting insert according to claim 12, wherein the cutting insert has four shafts and four cutting heads.

15. Cutting insert according to claim 14, wherein the cutting insert comprises a hard material.

16. Cutting insert according to claim 15, wherein the hard material comprises cemented carbide.

17. Cutting insert according to claim 15, wherein the hard material comprises a ceramic.

* * * * *